United States Patent

[11] 3,554,335

[72] Inventors Wilhelm Ritter
Bad Neustadt Saale, 0;
Hans-Joachim Adelski, Bad Neustadt, Germany
[21] Appl. No. 725,875
[22] Filed May 1, 1968
[45] Patented Jan. 12, 1971
[73] Assignee Siemens Aktiengesellschaft
Munich, Germany and Berlin, Germany, a corporation of Germany
[32] Priority May 5, 1967
[33] Germany
[31] No. 109,736

[54] ELECTROMAGNETICALLY CONTROLLED FRICTION CLUTCH
8 Claims, 4 Drawing Figs.
[52] U.S. Cl. .................................................. 188/171, 188/166
[51] Int. Cl. ....................................................... B60t 13/04
[50] Field of Search ........................................... 188/170, 171, 166, 196M; 192/90

[56] References Cited
UNITED STATES PATENTS
2,059,028 10/1936 Price ............................ 188/171
3,224,540 12/1965 Straub ......................... 188/171X FOREIGN PATENTS
1,302,615 7/1962 France ......................... 188/166

Primary Examiner—Duane A. Reger
Attorneys—Curt M. Avery, Arthur E. Wilfond, Herbert L. Lerner and Daniel J. Tick ABSTRACT: A spring set and electromagnetically released friction brake, preferably for electric motors, has an exteriorly threaded sleeve coaxially spaced from the magnetic armature disc which is magnetically attracted toward the releasing position. A ring-shaped abutment structure surrounds the sleeve and is held in an adjusted position relative to the sleeve by means of a ring which is seated on the sleeve in threaded engagement therewith. One end of each brake pressure spring is in pressure engagement with the armature disc. The other end bears against the abutment structure. Rotating the ring on the sleeve causes the ring to shift axially and thereby also displaces the abutment structure to adjust the spring force. The threaded ring is prevented from inadvertent rotation by having marginal recesses engaged by leaf springs which are fastened to the ring-shaped abutment structure and are lifted out of the recesses when a tubular wrench or the like tool is pushed over the ring for the purpose of turning it.

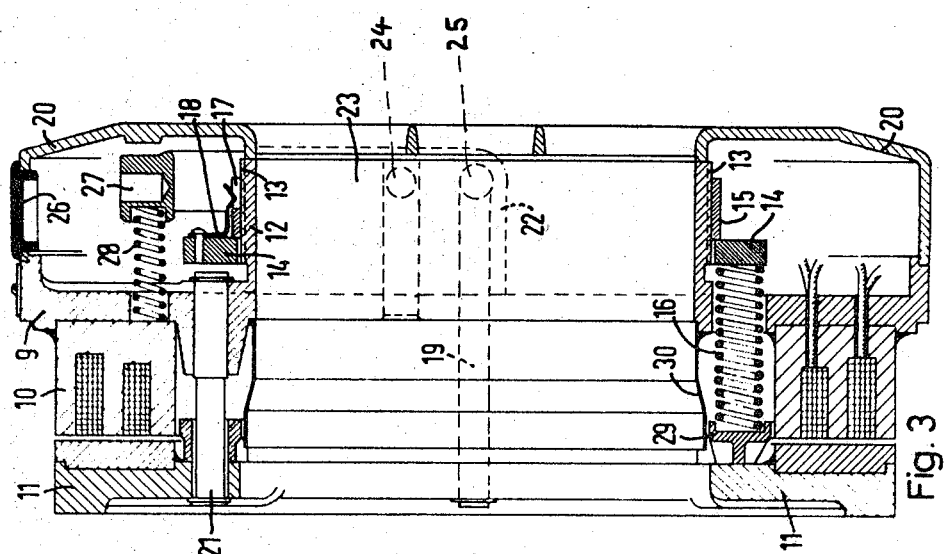
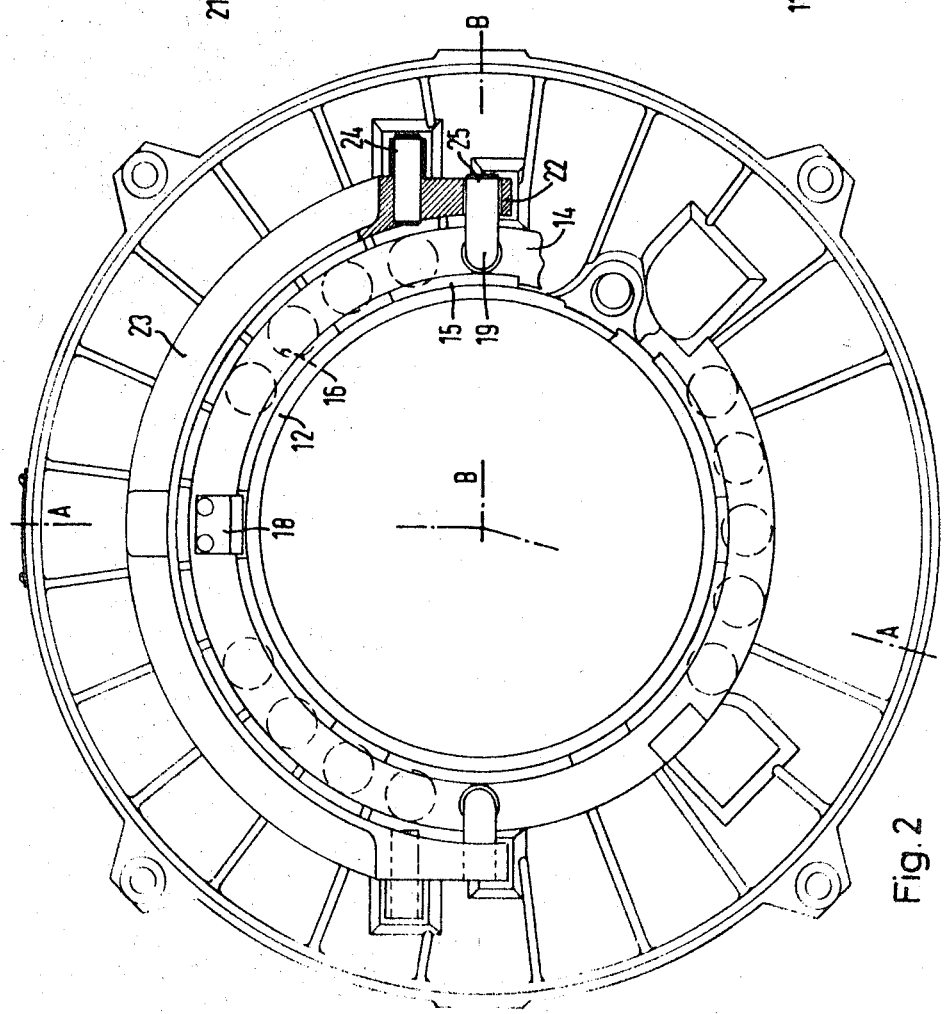

ELECTROMAGNETICALLY CONTROLLED FRICTION CLUTCH

Our invention relates to electromagnetic disc brakes and particularly to those suitable for use with electric motors. In a more specific aspect, our invention concerns friction brakes that are set mechanically with the aid of pressure springs and are released electromagnetically, for example under control by electric current switched on when a motor controlled by the brake is put into operation.

Various applications of such brakes make it desirable that the braking moment or braking force exerted by the pressure springs can be steplessly adjusted, and this heretofore has required the provision of rather large or inconvenient constructions.

It is an object of our invention to provide an electromagnetically controlled friction brake which affords a continuous and hence stepless adjusting of the braking moment with the aid of relatively simple, compact, reliable, and readily settable device.

Another object of our invention is to devise an electromagnetically controlled brake which, aside from satisfying the aforementioned object, also permits lifting the brake manually with the aid of simple means affording a reliable manner of operation.

To achieve these objects and in accordance with a feature of our invention, the brake pressure springs, acting upon the magnetic armature disc, have their respective ends remote from the armature disc rest against a ring-shaped abutment structure which is axially displaceable by means of a ring rotationally seated upon, and in threaded engagement with, an exteriorly threaded sleeve. For adjusting or varying the effective force of the pressure springs and consequently the braking torque or moment, it is only necessary to turn the threaded ring, for example with the aid of a tubular wrench, thus placing the brake pressure springs under correspondingly higher or lower precompression.

According to another feature of our invention, we provide for manual release of the brake with the aid of a lever which acts upon axially displaceable pins upon which the magnetic armature disc is seated and which pull the armature disc away from the friction disc proper and toward the core structure of the brake magnet.

The above-mentioned and further objects, advantages and features of our invention will be apparent from, and will be set forth in, the following with reference to an embodiment of an electromagnetically controlled friction brake for an electric motor illustrated by way of example in the accompanying drawings, in which:

FIG. 2 is a front view of the same brake, the housing cover of the brake being removed;

FIG. 3 is a section along the line A—A in FIG. 2; and

Figure 1:
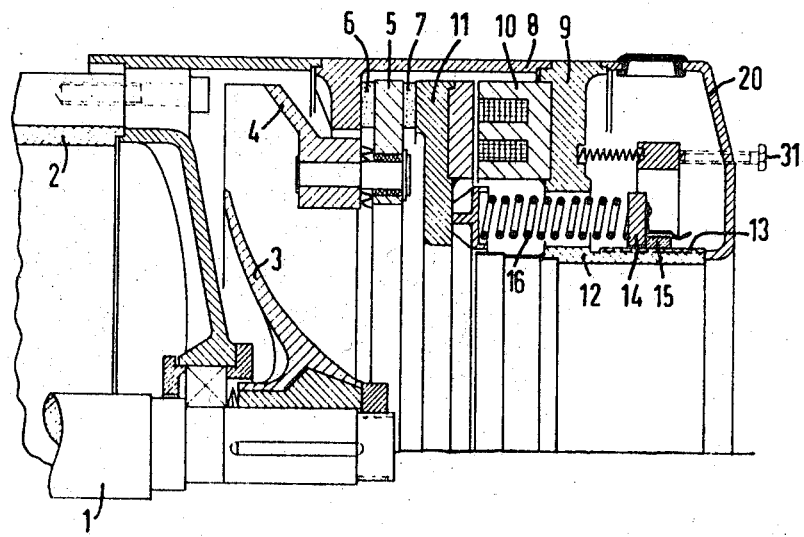
FIG. 1 shows partially a longitudinal section of the brake and of a motor with which the brake is combined.

The drawings show part of an electric motor on whose shaft 1 a fan is mounted outside of the motor housing 2 (FIG. 1). The fan has a peripheral rim 4 which surrounds the individual fan vanes and serves as a carrier of a coaxial brake disc 5 with ring-shaped friction linings 6 and 7 attached on both sides of the disc. A cylindrical brake housing 8 is fastened to the motor and carries a supporting plate 9. Mounted on plate 9 is the magnet core 10 of the electromagnetic device for releasing the brake, the appertaining armature disc 11 being arranged between the core 10 and the brake disc 5. The carrier plate 9 is provided with a centrally and axially located sleeve 12 which, as illustrated, may constitute a projection integral with the plate 9. The sleeve 12 has an external screw thread 13 and is surrounded by a ring-shaped abutment or pressure structure 14 which rests against a threaded ring 15 seated on the sleeve 12 and in threaded engagement therewith. Rotation of the ring 15 causes it to shift axially along the sleeve 12.

Figure 4:
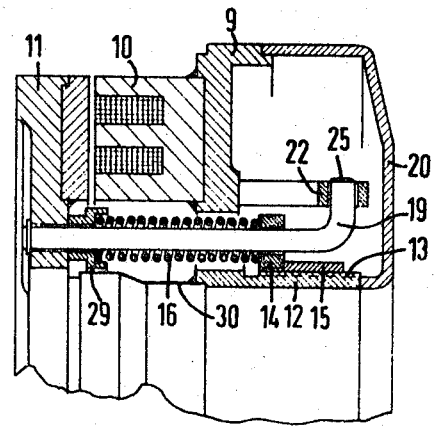
FIG. 4 is a section along the line B—B in FIG. 2.

The brake pressure springs 16, consisting of helical compression springs, are prestressed between the abutment ring structure 14 and the magnet armature disc 11. To prevent inadvertent rotation of the threaded ring 15, it has marginal catch recesses 17 distributed over its periphery and engaged by leaf springs 18 fastened to the abutment ring structure 14. The abutment structure 14 cannot rotate because it is guided for axial displacement on two pins 19 (FIGS. 2, 4).

For changing the braking moment, a cover 20 is to be removed from the housing. This makes the sleeve 12 accessible from the outside so that a correspondingly shaped tubular wrench can be pushed over the threaded ring 15. This has the effect of simultaneously lifting the leaf springs 18 off the ring 15 (FIG. 1). By then turning the threaded ring 15, the annular abutment structure 14 is shifted axially thus increasing or decreasing the compressive prestress of the brake springs 16.

It will be noted that the components of the brake proper, inclusive of the magnet core 10, are mounted on the carrier plate 9 so as to form a structural insert or subassembly unit together therewith. After removing this subassembly unit as a whole, the brake disc 5 fastened to the fan 3 of the motor and the linings mounted on disc 5 are readily accessible and exchangeable. This easy accessibility of the essential components constitutes another advantage afforded by virtue of the invention.

The magnet armature disc 11 is seated on a stationary pin 21 (FIG. 3) as well as on the above-mentioned two pins 19. The latter pins serve as lifting pins for releasing the brake by hand. This is done as follows: A U-shaped lever 22 pivoted at 24 has one of its legs 23 curved to a semicircle extending about part of the periphery of the central sleeve 12 (FIG. 2). The two lifting pins 19 have their respective ends 25 remote from the armature disc bent at a right angle to the major extent of these pins. The pin ends 25 rest against the lifting lever 22 (FIG. 4). If the brake is to be released by hand, a closure 26 (FIG. 3) seated in the cover 20 is to be removed, and a mandrel is to be stuck through the opening into a recess 27 of the lever arm 23. Now the lever arm 23 and consequently the lever 22 can be pressed toward the armature disc in opposition to the force of a restoring spring 26 which tends to hold the lever 22 and the pins 19 in the inactive position. Pressing the lever 22 has the effect that the pins 19 are axially displaced in the opposite direction and entrain the armature disc 11. This pulls the armature disc toward the magnet core 10 and hence away from the brake friction disc, whereby the brake is released. If desired, the brake can be held in the released condition by arresting the lever arm 23 in the lifted position with the aid of a set screw 31 (FIG. 1). The brake pressure springs 16 have their ends at the armature disc 11 seated in a ring 29 of nonmagnetic material (FIGS. 3, 4). The ring 29 holds the spring ends at some distance from the air gap of the magnet. This prevents the occurence of magnetic shunt paths. The nonmagnetic ring 29 also serves, together with a protective tube 30, to protect the interior of the brake from ingress of soil, dust or water.

To those skilled in the art it will be obvious upon a study of this disclosure that with respect to structural details as well as specific uses, our invention permits of various modifications and hence may be given embodiments other than particularly illustrated and described herein, without departing from the essential features of the invention and within the scope of the claims annexed hereto.

We claim:

1. An electromagnetically releasable friction brake, comprising circular brake friction means, an electromagnetic device having a magnetic air gap and an armature disc coaxially adjacent to said friction means and axially displaceable relative thereto for setting and releasing the brake, an exteriorly threaded sleeve coaxially spaced from said disc, a free ring-shaped abutment structure surrounding said sleeve, a plurality of brake pressure springs of which each has one end in pressure engagement with said armature disc and the other end abutting against said free abutment structure whereby a variation in the force of said springs and therefore a braking torque may be applied to said armature disc without varying the dimensions of said magnetic air gap, a ring seated on said sleeve in threaded engagement therewith and engaging said abutment structure whereby rotation of said ring on said sleeve displaces said abutment structure for adjusting the spring force.

2. An electromagnetically releasable friction brake, comprising circular brake friction means, an electromagnetic device having an armature disc coaxially adjacent to said friction means and axially displaceable relative thereto for setting and releasing the brake, an exteriorly threaded sleeve coaxially spaced from said disc, a ring-shaped abutment structure surrounding said sleeve, brake pressure springs of which each has one end in pressure engagement with said armature disc and the other end abutting against said abutment structure, a ring seated on said sleeve in threaded engagement therewith and engaging said abutment structure whereby rotation of said ring on said sleeve displaces said abutment structure for adjusting the spring force, said ring having catch recesses along its periphery, and leaf springs mounted on said ring-shaped abutment structure and engageable with said respective recesses for latching said ring against rotation relative to said sleeve.

3. A brake as claimed in claim 2 wherein said ring is accessible from the side of said sleeve facing away from said armature disc for insertion of a tubular tool for turning said ring on said sleeve, and said leaf springs have respective deflectable ends facing towards said same side, so that insertion of a tool causes unlatching of said ring.

4. An electromagnetically releasable friction brake, comprising circular brake friction means, an electromagnetic device having an armature disc coaxially adjacent to said friction means and axially displaceable relative thereto for setting and releasing the brake, an exteriorly threaded sleeve coaxially spaced from said disc, a ring-shaped abutment structure surrounding said sleeve, brake pressure springs of which each has one end in pressure engagement with said armature disc and the other end abutting against said abutment structure, a ring seated on said sleeve in threaded engagement therewith and engaging said abutment structure whereby rotation of said ring on said sleeve displaces said abutment structure for adjusting the spring force, an axially extending guide structure fixed relative to said sleeve, said armature disc being displaceably seated on guide structure, axially displaceable pins having one end engageable with said armature disc and extending therefrom toward the side where said sleeve is located, and a manually actuable brake release lever linked to the other end of said pins for axially shifting them to thereby move said armature disc to releasing position.

5. A brake as claimed in claim 4 further comprising a restoring spring in biasing relation to said lever for normally holding it in the position where said lever and said pins are inactive relative to said armature disc.

6. A brake as claimed in claim 1 further comprising a ring of nonmagnetic material coaxially interposed between said armature disc and said brake pressure springs.

7. A brake as claimed in claim 1 further comprising a housing perimetrically surrounding said friction means and said electromagnetic device and having a carrier plate which covers the axial end of said housing, said electromagnetic device and said sleeve and abutment structure being mounted on said carrier plate and forming together therewith a subassembly unit removable as a whole from said housing.

8. A brake as claimed in claim 7 in combination with an electric motor to which said brake housing is coaxially attached, said motor comprising a fan in said housing, and said friction means having a friction disc coaxially secured to said fan and accessible upon removal of said subassembly unit.